United States Patent [19]

Kuhn et al.

[11] Patent Number: 4,575,110
[45] Date of Patent: Mar. 11, 1986

[54] DEVICE FOR DAMPING OSCILLATIONS OF A TRAILER

[75] Inventors: Wolfgang Kuhn, Stuttgart; Karl-Heinz Richter, Kernen, both of Fed. Rep. of Germany

[73] Assignee: Daimler-Benz Aktiengesellschaft, Fed. Rep. of Germany

[21] Appl. No.: 466,538

[22] Filed: Feb. 15, 1983

[30] Foreign Application Priority Data

Feb. 17, 1982 [DE] Fed. Rep. of Germany ....... 3205668

[51] Int. Cl.⁴ ............................................. B60D 1/00
[52] U.S. Cl. ................................. 280/446 R; 280/447; 280/467; 280/468; 280/474
[58] Field of Search .......... 280/446 R, 446 B, 446 A, 280/447, 448, 460 R, 462, 467, 471, 472, 474, 408, DIG. 14, 468; 172/677

[56] References Cited

U.S. PATENT DOCUMENTS

| 2,171,846 | 9/1939 | Davidson | 280/471 X |
| 2,350,579 | 6/1944 | Bingham | 280/446 A |
| 3,659,874 | 5/1972 | Rendessy | 280/446 B |
| 4,019,754 | 4/1977 | Hinckley | 280/446 R X |
| 4,438,944 | 3/1984 | Della-Moretta | 280/460 R |

FOREIGN PATENT DOCUMENTS

| 822472 | 11/1951 | Fed. Rep. of Germany | 280/468 |
| 683210 | 2/1965 | Italy | 280/446 B |
| 1155359 | 6/1969 | United Kingdom | 280/460 R |

Primary Examiner—Joseph F. Peters, Jr.
Assistant Examiner—Mitchell J. Hill
Attorney, Agent, or Firm—Craig and Burns

[57] ABSTRACT

The invention relates to a device for damping pendulum oscillations of a trailer hitched to a coupling of a motor vehicle. For this purpose, the coupling at the rear of the motor vehicle is horizontally adjustable at right angles to the longitudinal axis of the vehicle, and damping means serve for adjusting the coupling, in proportion to the deflection of the trailer drawbar, from a position lying on the longitudinal axis of the vehicle in the direction of the side of the motor vehicle into which the trailer is swerving.

Transverse movements of the coupling relatively to the superstructure of the motor vehicle cause a continuous shifting in the instantaneous fulcrum or center of rotation of the trailer drawbar forwardly along the longitudinal vehicle axis, whereby interfering forces impairing the driving direction of the trailer are counteracted and driving stability is ensured.

13 Claims, 5 Drawing Figures

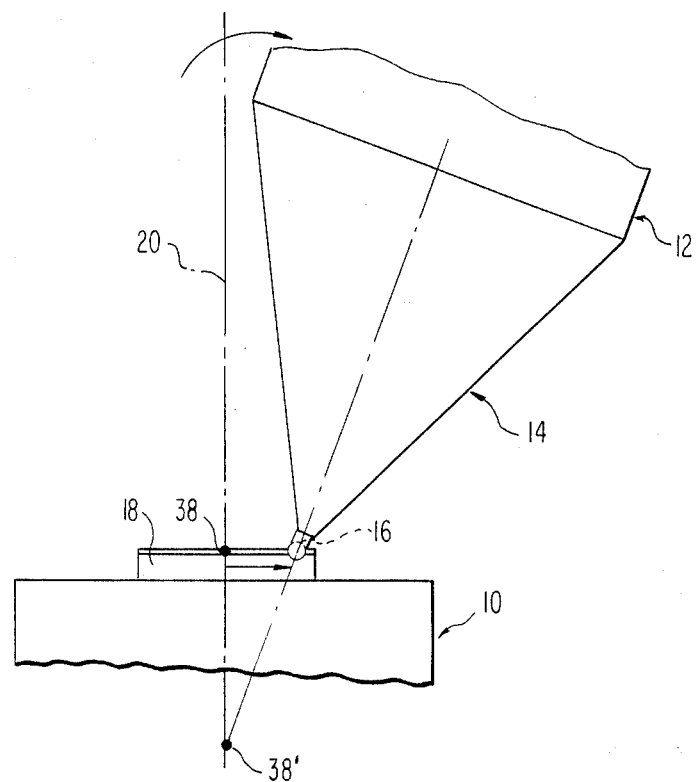
FIG. 2
FIG. 1a
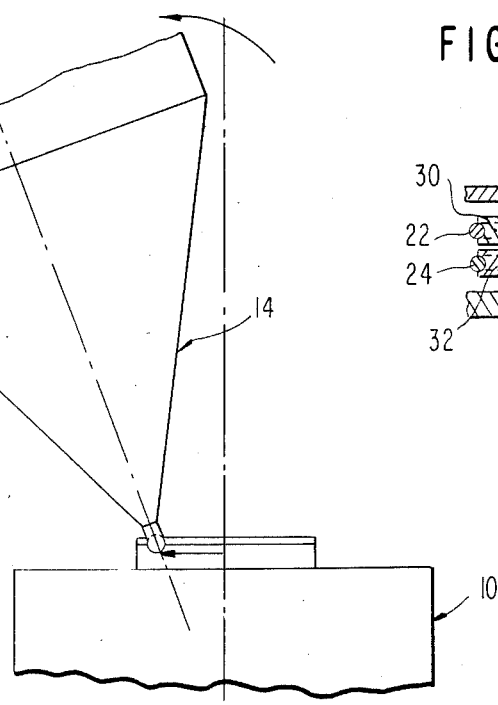
FIG. 3

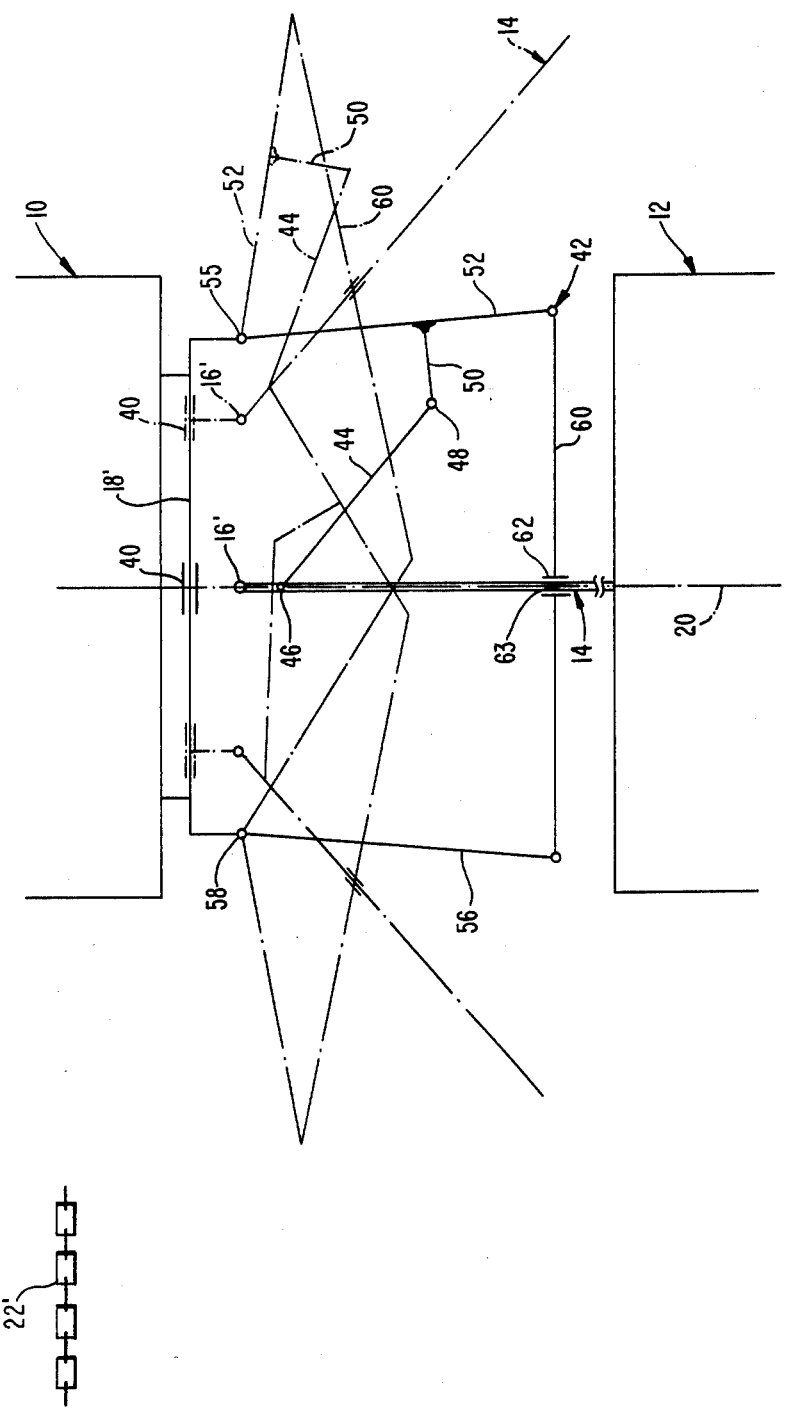

DEVICE FOR DAMPING OSCILLATIONS OF A TRAILER

The invention concerns a device for damping oscillations of a trailer hitched with its drawbar to a coupling provided at the rear end of a motor vehicle, with damping means activatable in dependence on the size of the jackknife angle of the trailer drawbar with respect to the motor vehicle, occurring during swerving of the trailer, for damping the swerving motions, these damping means counteracting the swerving motions at the rear end of the motor vehicle.

Trailers pulled by a motor vehicle can execute motions during driving oriented at right angles to the driving direction of the vehicle-trailer combination. The motions can be used by various factors. They can be triggered, for example, by crosswind, inclined position of the roadway, or poor condition of the road surface.

Such oscillations, which greatly reduce driving safety, occur to an increased extent in single-axle trailers, especially house trailers, or in case the weight of the vehicle-trailer combination is relatively small, but its velocity correspondingly very high.

DOS (German Unexamined Laid-Open Application) No. 2,701,834 discloses a device having the features of the device as discussed above, in order to reduce and/or suppress oscillations of trailers. the damping means in this construction exhibit, for example, rods arranged laterally of the drawbar and extending away therefrom at an acute angle in the direction toward the motor vehicle, these rods being held at the rear end of the motor vehicle. The drawbar, in turn, is pivotably coupled to the spherical head arranged at the rear end of the body of the motor vehicle and lying on the longitudinal axis of the vehicle.

The rods cooperate with pistons of a suitable hydraulic system, guided in appropriate cylinders and being under oil pressure, which pistons are arranged at the drawbar. Displacement of the pressure oil from the cylinders guiding the pistons can only take place if an outlet valve is placed under a predetermined pressure force.

When driving straight ahead, the lengths of both rods are identical. Thus, these rods maintain the trailer drawbar in the driving direction of the vehicle-trailer combination, the oil pressure in the hydraulic system preventing any deviation which would evoke a swerving motion.

This conventional device can also be equipped with cables instead of rods, these cables being anchored on the drawbar side to corresponding slides displaceable against the effect of pressure oil.

This conventional construction is expensive from a technical viewpoint and is operable only with the use of auxiliary energy to produce the oil pressure.

The present invention, therefore, is based on providing a device of the type described hereinabove, operating in accordance with a principle requiring no auxiliary energy and being easy to realize from a technical standpoint.

According to the invention, the coupling at the motor vehicle is adjustable horizontally at right angles to the longitudinal axis of the vehicle and is displaceable by the damping means, in proportion to the drawbar deflection, from a position lying on the longitudinal axis of the vehicle in the direction of the side of the motor vehicle into which the trailer is swerving.

The invention is based on the realization that a transverse movement of the coupling relatively to the motor vehicle causes a continuous displacement of the coupling point along the longitudinal axis of the vehicle.

Accordingly, upon swerving of the trailer, a displacement occurs of the instantaneous fulcrum of the trailer drawbar along the longitudinal axis of the vehicle in the forward direction, with the consequence that interfering forces, which normally impair the stability of the driving direction of the trailer, are effectively counteracted and driving stability is ensured even in extreme driving situations.

According to advantageous features of the invention, the damping device comprises for each adjustment direction of a coupling, at least one adjusting element which, as seen in the adjusting direction of the coupling, engages the latter on mutually opposite sides thereof and operable for the adjustment of the coupling by the swerving trailer.

According to another advantageous feature of the invention, adjusting elements are provided which are flexibly elongated elements, for example, cables or chains, which are attached with one of their ends to respectively one side of the trailer drawbar, and are guided over deflecting means or guide rollers mounted on the rear end of the motor vehicle, and are retained with their other ends at the corresponding side of the coupling.

According to still another advantageous feature of the invention, a device according to the invention is characterized in that a coupling is adjustable, especially in a linear fashion along a guide rail arranged at the rear end of the motor vehicle.

Another advantageous feature of the invention is a device characterized in that guide rollers are arranged at a lateral spacing of each end face of the guide rail at the rear end of the motor vehicle mutually coaxially and rotatable about a vertical axle, longitudinal elements being guided in mutually opposed directions about respectively one of the guide rollers of both roller arrangements. Thus, it is advantageous if the damping means comprise at least one adjusting element for each adjusting direction of the coupling; these adjusting elements, as seen in the adjusting direction of the coupling, engage the latter on mutually opposite sides and can be operated for the adjustment of the coupling by the swerving trailer. This type of construction makes it possible to effect a purely mechanical or hydraulic displacement of the coupling at the rear end of the motor vehicle.

An especially simple construction provides, as the adjusting elements, flexible elongated members, for example cables or chains, attached with one of their ends to respectively one side of the trailer drawbar, extended via deflection (guide) means arranged at the rear end of the motor vehicle, and retained with their other ends at the corresponding side of the coupling.

In this connection, it is advantageous if the coupling is adjustable especially linerally along a horizontal guide rail arranged at the rear end of the motor vehicle, and if guide rollers arranged mutually coaxially at a lateral spacing of each end face of the guide rail at the rear end of the motor vehicle and rototable about a vertical axis are included; and if the adjusting elements are guided, in mutually opposed directions, around respectively one of the guide rollers of both roller arrangements.

In this connection, it should be noted that trailer couplings have been known wherein the coupling head at the motor vehicle is adjustable at right angles to the longitudinal vehicle axis (DOS No. 2,844,684; DOS No. 2,909,429).

However, the transverse adjustability of the coupling in these coupling constructions serves for being able to arbitrarily swing out the drawbar of a trailer, when maneuvering the latter or when the latter is pushed backwards, in the direction into which pivoting of the respective trailer front axle is necessary, for example for avoiding the jackknifing of such axle.

Accordingly, it is an object of the invention to provide an improved device for damping pendulum oscillations of a trailer.

It is another object of the invention to provide a device for damping oscillations of a trailer operating in accordance with a principle requiring no auxiliary energy and being easy to realize from a technical standpoint.

It is another object of the invention to provide a device for damping oscillations of a trailer wherein the coupling at the motor vehicle is adjustable horizontally at right angles to the longitudinal axis of the vehicle and is displaceable by a damping means, in proportion to the drawbar deflection, from a position lying on the longitudinal axis of the vehicle in the direction of the side of the motor vehicle into which the trailer is swerving.

It is another object of the invention to provide a device for damping pendulum oscillations of a trailer hitched with its drawbar to a coupling provided at the rear end of a motor vehicle, with the use of damping means activatable in dependence on the size of the jackknife angle of the trailer drawbar with respect to the motor vehicle, occurring during swerving of the trailer, for damping the swerving motions, these damping motions counteracting the serving motions at the rear end of the motor vehicle and wherein the coupling at the motor vehicle is horizontally adjustable at right angles to the longitudinal vehicle axis and is displaceable by the damping means, in proportion to the drawbar deflection from a position lying on the longitudinal axis in the direction of the side of the motor vehicle into which the trailer is swerving.

It is another object of the invention to provide a device for damping oscillations of a trailer hitched with its drawbar to a coupling provided at the rear end of a motor vehicle wherein a damping means comprises for each adjustment direction of a coupling, at least one adjusting element which, as seen in the adjusting direction of the coupling engages the latter on mutually opposite sides thereof and is operable for the adjustment of the coupling by the swerving of the trailer.

It is another object of the invention to provide a device for damping oscillations of a vehicle trailer wherein adjusting elements are provided as flexible elongated elements such as cables or chains which are attached with one of their ends to respectively one side of the trailer drawbar and are guided over deflecting means mounted to the rear end of the motor vehicle and are retained with their other ends at a corresponding side of the coupling.

It is another object of the invention to provide a device for damping oscillations of a trailer hitched to a motor vehicle wherein a coupling is adjustable in a linear fashion along a guide rail arranged at the rear end of the motor vehicle.

It is a further object of the invention to provide a means for damping oscillations of a trailer drawn by a motor vehicle wherein guide rollers are arranged at a lateral spacing of each end face of a guide rail at the rear end of the motor vehicle mutually coaxially and rotatable about a vertical axis, the longitudinal elements being provided which are guided in mutually opposed directions about respectively one of the guide rollers of both roller arrangements.

These and other objects, features, and advantages of the present invention will become more apparent from the following description when taken in conjunction with the accompanying drawings which show, for the purposes of illustration only, two embodiments in accordance with the present invention, and wherein:

FIG. 1a is a partial sectional view along line 1a–1a of FIG. 1, FIG. 1b shows an alternative for adjusting elements wherein chain is employed in lieu of cable.

FIGS. 2 and 3 are illustrations of the drawbar displacement of the trailer relatively to the rear of the motor vehicle upon a lateral swerving of the same, the adjusting means for the drawbar displacement not being inlcuded in these illustrations.

FIG. 4 is an illustration, similar to FIG. 1, of a second embodiment of the device in accordance with the invention.

Figure 1:
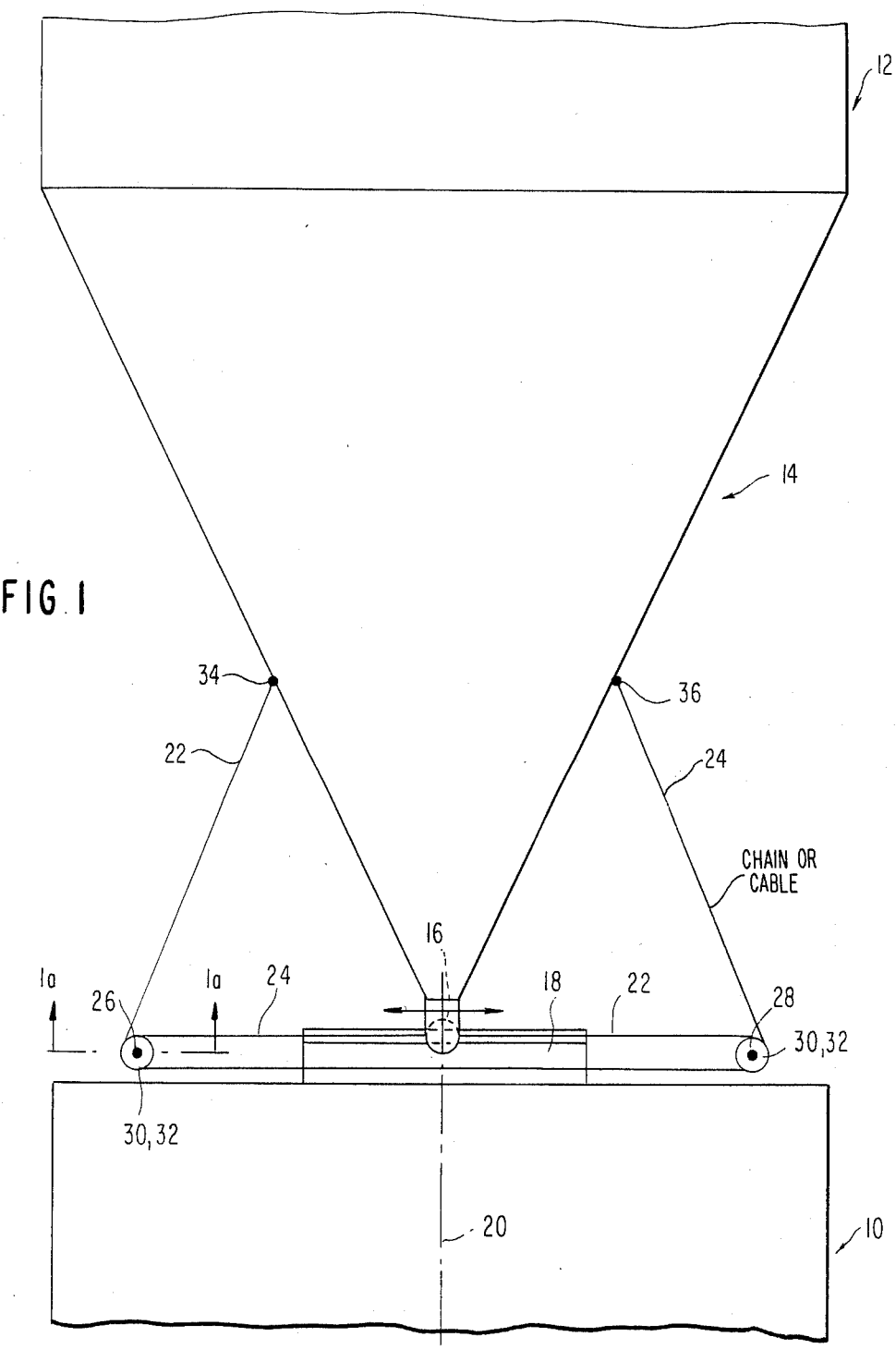
FIG. 1 is a top view of the rear of a motor vehicle to which a trailer is coupled and which is equipped with a first embodiment of a device for damping oscillations of the trailer, the trailer being in its straightforward driving position.

In the drawings wherein like elements are designated by like reference numerals, the motor vehicle, for example a passenger car, is denote in its entirety by 10, and a trailer coupled to the rear of this vehicle, for example a single-axle camping trailer, is denoted by 12. In this connection, the trailer 12 is equipped with a drawbar 14 fashioned as a drawing fork or towing fork movably coupled with its front end to a coupling 16 provided at the rear of the motor vehicle. The coupling forms part of a device for damping oscillations of the trailer and, for this purpose, is adjustable at the rear of the motor vehicle horizontally at right angles to the longitudinal axis of the vehicle. For this purpose, the coupling is adjustable, preferably linearly, along a horizontal guide rail 18 arranged at the motor vehicle. The mounting of the guide rail at the vehicle rear is such that the longitudinal cente of the rail lies on the longitudinal vehicle axis 20 so that the rail extends symmetrically toward both sides of this axis.

The device of this invention is constructed so that the coupling 16 is adjustable in proportion to the lateral deflection of the drawbar 14 from a position lying on the longitudinal vehicle axis 20 in the direction into which the trailer 12 is swerving. This adjustment of the coupling is accomplished by adjusting elements constituted preferably by respectively cables 22 and 24. These cables are associated, at the rear of the motor vehicle, with guide rollers rotatable about vertical axles 26 and 28 at a lateral spacing of each end face of the guide rail 18; per cable, one guide roller 30 and 32, respectively, is mounted on each axle (as per FIG. 1a).

FIG. 1b shows an alternative adjusting element 22' comprising chain in lieu of cable. It will be appreciated that chain may also be used for adjusting element 24.

Each cable is guided over one of the guide rollers 30, 32 associated therewith, and anchored with one end on one side of the drawbar 14 at 34 and 36, respectively, while these cables are attached, with their other ends, to the coupling 16, as seen in the adjustment direction of the coupling, on mutually opposed ends in such as way that the coupling 16, in case of a lateral swerving of the trailer, is shifted in the swerving direction along the guide rail 18. Thus, cable 22 is anchored at 34 to the drawbar 14, passes over first and second guide rollers 30, FIG. 1*a*, mounted on ewach side of the vehicle, and is anchored to the coupling 16. In like fashion, cable 24 is anchored to the drawbar 14 at 36, passes over two guide rollers 32 and is anchored to the coupling 16 on the opposite side from cable 22.

FIGS. 2 and 3 clarify the mode of operation of the device. Accordingly, a transverse shifting of the coupling 16, caused by swerving motions in the lateral direction of the trailer, has the result that the instantaneous fulcrum 38 lying in the plane of the longitudinal vehicle axis on the guide rail 18 during straight-forward driving of the vehicle-trailer combination, is continuously displaced forwardly along the longitudinal vehicle axis to a point 38', thereby producing the prerequisite for a rapid attenuation oscillations of the trailer, in that, due to the displacement of the instantaneous fulcrum, the drawbar is, so to speak, extended in length, which correspondingly enhances the desired maintenance of the driving direction of the trailer.

In the embodiment of the device shown in FIG. 4, in analogy with the construction described hereinabove, the motor vehicle, trailer and drawbar are denoted by 10, 12 and 14, respectively. The guide rail is denoted by 18' and the coupling by 16'. In this case, the coupling forms part of a slide 40, guided for longitudinal displacement on the guide rail 18', and can be coupled to the front end of the drawbar 14.

Associated with the rod-shaped drawbar 14 and the slide 40 is an adjusting device, denoted in its entirety by 42, with the help of which the slide 40, together with the coupling 16', is displaceable in the direction of the side of the motor vehicle 10 onto which the trailer 12 swerves, in proportion to the lateal deflection of the drawbar 14 fixedly mounted on the trailer 12.

The adjusting device 42 is equipped with an adjusting bar 44 which, firstly, is mounted for pivotal motion at 46, in the proximity of the coupling 16', on the drawbar 14, and extends obliquely outwardly therefrom in the direction of the trailer 12, and, secondly, is mounted for pivotal motion at 48 at a lever attachement 50 of a swivel lever 52.

The swivel lever 52 is mounted at 55, on the guide rail 18', at a lateral spacing from the longitudinal vehicle center 20, for pivotal motion in all directions, and extends in the direction of the trailer. Associated with this swivel lever 52, symmetrically to the longitudinal vehicle center, is a similar swivel lever 56 which is mounted for pivotal motion at 58 on the guide rail 18'.

Both swivel levers 52, 56 are movably connected to one another at their free end by a connecting rod 60 attached to them for pivotal motion. Arranged at the longitudinal center of the connecting rod is a drawbar receiving head 62 which is mounted on the connecting rod 60 for swivel motion about a transverse axis 63. The rod-shaped drawbar 14 is arranged in the receiving head for both rotational motion, so as to be able to execute the same rolling motions as the trailer, and for longitudinal displacement.

This adjusting device 42 operates kinematically precisely, when the levers are appropriately adjusted, and good driving stability is ensured at high speeds, with a high degree of transverse displacement of the slide 40 being obtained, even in the case of small bending angles, to displace the instantaneous trailer fulcrum forwardly along the longitudinal vehicle axis. On the other hand, this transverse displacement is considerably decreased during the end phase of strong trailer swerving motions.

In this connection, it should be noted that the device 42 is also capable of functioning when the swivel lever 56 is eliminated and the connecting rod 60 merely extends from the swivel lever 52 to the drawbar 14. In this case, the drawbar 14 must be mounted in the drawbar receiving head 62 so as not to be axially displaceable.

The damping of oscillations of a trailer in accordance with the invention, as explained in the specification, is to be understood as a suppressing of thrust or rolling motions.

While we have shown and described only two embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as ar encompassed by the scope of the appended claims.

We claim:

1. Device for damping oscillations of a trailer hitched with its drawbar to a motor vehicle, comprising
    damping means mounted at least to the trailer and activatable in response to the magnitude of the jackknife angle of the trailer drawbar with respect to the motor vehicle occurring during swerving of the trailer to counteract the swerving motions at the rear end of the motor vehicle, and
    coupling means between the motor vehicle and trailer horizontally adjusted at substantially right angles to a longitudinal axis of the vehicle displaceable in response to the damping means in proportion to the drawbar deflection from a position lying on the longitudinal vehicle axis to a position in the direction of the side of the motor vehicle into which the trailer is swerving.

2. Device according to claim 1, wherein the damping means comprise, for each adjustment direction of the coupling means, at least one adjusting element means which as seen in the adjusting direction of the coupling means engages the coupling means on mutually opposite sides thereof for adjusting the coupling means in response to the swerving of the trailer.

3. Device according to claim 2, wherein the adjusting element means are flexible elongated elements, one of cables and chains, which are attached, with one of their ends to respectively one side of the trailer drawbar and guided over deflecting means mounted to the rear end of the motor vehicle, the adjusting element means being retained with their other ends at a corresponding side of the coupling means.

4. Device according to claim 3, wherein the coupling means is adjustable, in a substantially linear fashion, along a guide rail arranged at the rear end of the motor vehicle.

5. Device according to claim 4, the damping means further comprising
    guide rollers arranged at a lateral spacing of each end face of the guide rail at the rear end of the motor vehicle mutually coaxially and rotatable about a substantially vertical axis, the longitudinal elements being guided in mutually opposed directions about respectively one of the guide rollers of both roller arrangements.

6. Device for damping lateral oscillations of a trailer having a first longitudinal axis hitched by its drawbar to a coupling mounted on the rear end of a motor vehicle having a second longitudinal axis comprising means mounted at least to the drawbar for positioning said coupling movable on said vehicle along a first line substantially perpendicular to the longitudinal axis of the vehicle in response to the magnitude of the angle between the first and second longitudinal axes such that, upon lateral oscillation of the trailer, the first longitudinal axis of the trailer intersects the second longitudinal axis of the vehicle at a point located at a position which is one of a first point at the intersection of the first line and the second longitudinal axis of the vehicle, and a second point located along the second longitudinal axis of the vehicle in the direction of forward vehicular travel with respect to said first point.

7. A device for reducing oscillations of a trailer having a drawbar of a predetermined length and attached by coupling means to a motor vehicle comprising means mounted at least to the drawbar for increasing the effective length of the drawbar to a value greater than said predetermined length by positioning the coupling means to position lateral with respect to longitudinal axis of the vehicle in a direction transverse to the direction of vehicle movement in response to the angle between a longitudinal axis of the vehicle and a longitudinal axis of the trailer and means movable around at least one of first and second points on opposite sides of said vehicle for connecting at least one of first and second points on opposite sides of the trailer to said coupling means.

8. A trailer coupling according to claim 7, wherein in that at the pulling vehicle the coupling comprises pivoted levers flexibly coupled to each othe at identical lateral distances with respect to the longitudinal axis of the pulling vehicle, a connecting member and means receiving the drawbar at the connecting member to render the drawbar adjustable in the direction of the axis of the drawbar and pivoted around an axis that is substantially transverse with respect to the axis of the drawbar.

9. A trailer coupling according to claim 8, further comprising plural flexible control members, one end of each member fastened at one side of the trailer or its drawbar, the control members being guided in opposite directions around deflecting means arranged at the rear of the pulling vehicle at a lateral distance from the longitudinal axis of the vehicle and with the other end of each flexible member being fixed at the coupling.

10. A trailer coupling according to claim 9, further comprising a horizontal guide rail means for adjusting the coupling and arranged at the rear of a pulling vehicle.

11. A trailer coupling according to claim 9, further comprising the deflecting means comprising pulleys rotatable around a substantially vertical shaft, said pulleys being arranged at a lateral distance with respect to the respective ends of the guide rail.

12. Apparatus for coupling a trailer having a drawbar to a pulling vehicle comprising a guide rail mounted to said vehicle extending substantially transverse to a longitudinal axis of said vehicle, a slide means mounted to said drawbar for movement along said guide rail, an adjusting bar means mounted for pivotal motion with respect to the drawbar proximate the slide, at least one swivel lever means mounted for pivotal motion to said vehicle proximate an extension of the guide rail and pivoted with respect to the adjusting bar means, connecting rod means pivotally attached to said swivel lever means and mounted to a drawbar receiving head admitting the drawbar for rotational motion with respect to the receiving head and for longitudinal displacement of the drawbar with respect to the drawbar receiving head.

13. A trailer coupling in accordance with claim 12, further comprising a second swivel lever pivotally mounted proximate a second end of said guide rail opposite said first end, said connecting rod being pivotally mounted to said second swivel lever.

* * * * *